United States Patent [19]

Yerazunis

[11] Patent Number: 4,664,470

[45] Date of Patent: May 12, 1987

[54] METHOD AND SYSTEM FOR STRUCTURED RADIATION PRODUCTION INCLUDING A COMPOSITE FILTER AND METHOD OF MAKING

[75] Inventor: William S. Yerazunis, Troy, N.Y.

[73] Assignee: General Electric Company, Schenectady, N.Y.

[21] Appl. No.: 623,051

[22] Filed: Jun. 21, 1984

[51] Int. Cl.⁴ .................... G02B 5/28; G01B 11/00; G01C 3/20

[52] U.S. Cl. ................ 350/1.1; 250/237 G; 350/166; 356/1; 356/376

[58] Field of Search ............. 350/163, 164, 166, 320, 350/1.1; 358/331; 356/1, 376; 250/237 G

[56] References Cited

U.S. PATENT DOCUMENTS

| | | | |
|---|---|---|---|
| 3,619,065 | 11/1971 | Agnew | 356/120 |
| 4,158,507 | 6/1979 | Himmel | 356/376 |
| 4,175,862 | 11/1979 | DiMatteo et al. | 356/375 |
| 4,180,329 | 12/1979 | Hildebrand | 356/375 |
| 4,277,813 | 10/1980 | Pirlet | 356/372 |
| 4,349,277 | 9/1982 | Mundy et al. | 356/376 |
| 4,370,025 | 1/1983 | Sato et al. | 350/166 |

FOREIGN PATENT DOCUMENTS

| | | |
|---|---|---|
| 52-4129 | 2/1977 | Japan . |
| 5179831 | 1/1978 | Japan ................ 356/376 |

*Primary Examiner*—Bruce Y. Arnold

*Attorney, Agent, or Firm*—Donald R. Campbell; James C. Davis, Jr.; Paul R. Webb, II

[57] ABSTRACT

A method and system use a composite filter to produce a beam of light with patterns of different wavelength light mingled together in a controlled manner. The composite filter includes a first interference filter having a first interference pattern on a interference side of a first substrate and a second interference filter having a second interference pattern on an interference side of a second substrate. The first and second interference filters are bonded together with the first and second interference patterns abutting each other. The first interference pattern is made of interference material which passes visible light and reflects infrared light, whereas the second interference pattern passes infrared light and reflects visible light. The composite filter separates and light into alternate patterns of visible light and infrared light which are reflected from the surface of an object to generate surface measurement data.

A method of making a composite filter creates a first interference pattern of interference material at the interference side of the first substrate and places second interference patterns of interference material at the interference side of the first substrate. The second interference pattern is on an interference side of a second substrate which is bonded to the first substrate. The first and second interference patterns are created by selective etching using masks and photolithographic techniques.

7 Claims, 5 Drawing Figures

METHOD AND SYSTEM FOR STRUCTURED RADIATION PRODUCTION INCLUDING A COMPOSITE FILTER AND METHOD OF MAKING

BACKGROUND OF THE INVENTION

This invention relates to a method and system for structured radiation production and, more specifically, a method and system of structuring radiation for surface measurement with a composite filter. The invention further relates to a method of making a composite filter.

As used herein, "light" means visible light, infrared light and ultraviolet light. An "interference material" or "interference filter" refers to materials or filters which use one or more material layers providing a bandpass function by interference of electromagnetic waves. An "interference reflectable electromagnetic radiation" is any electromagnetic radiation which is reflectable by an interference filter and includes at least radiation between long infrared and soft X-ray radiation. Reference to radiation or light at a particular wavelength shall include radiation or light in a pass band including the particular wavelength.

The production of a beam of radiation in which patterns of differing wavelength radiation are mingled in a controlled and stable manner have a number of uses. For example, the radiation may be a pattern of visible and infrared radiation used specifically for non-contact sensing of three-dimensional surfaces.

U.S. Pat. No. 4,349,277 entitled "Non-Contact Measurement of Surface Profile", issued Sept. 14, 1982 to Joseph L. Mundy, Gilbert B. Porter, and Thomas M. Cipolla, assigned to the assignee of the present invention, discloses a parallax method of surface measurement based upon optical triangulation. The Mundy el al, patent, the subject matter of which is hereby incorporated by reference, discloses the generation of a structured pattern of alternate wavelength light which is applied to the surface of an object. Separate detector arrays for the separate wavelengths of light are used to determine the profile of the object on which the structured light is applied.

The structured light in the Mundy et al patent is produced by use of a dichroic (interference) filter which separates light from a quartz-halogen tungsten lamp into separate visible and infrared beams. One beam is transmitted through the filter, whereas the other beam is reflected by the filter. The separate beams are reflected by a further pair of mirrors in order to intersect on different sides of an aluminum-on-glass mirror which has been selectively etched to remove aluminum and leave transparent stripes. As one beam passes through from one side of the aluminum-on-glass mirror and the other beam is reflected from the opposite side of the aluminum-on-glass mirror, the two beams recombine into a beam which regularly varies between infrared and visible light.

The Mundy et al. patent further discloses an alternate approach for producing the structured radiation or light by use of film spatial patterns, instead of the patterned aluminum-on-glass mirror. Two such patterns may be prepared and the transmissions of the film patterns would be complementary. An output beam splitter is used to combine the wavelength bands. This alternate approach is described in the subject Patent in Column 6, lines 44-56.

OBJECTS OF THE INVENTION

Accordingly, it is a primary object of the present invention to provide a new and improved method and system for structured radiation production.

Another object of the present invention is to provide a method and system for structured radiation production which is relatively compact and mechanically robust.

Still another object of the present invention is to provide a method and system for structured radiation production which is relatively inexpensive and easy to align.

Yet another object of the present invention is to provide a method and system for structured radiation production having great power handling capability.

A further object of the present invention is to provide a method and system for structured radiation production having a flat optical focus.

A still further object of the present invention is to provide a composite filter for producing structured radiation.

Yet another object of the present invention is to provide a method of making a composite filter.

SUMMARY OF THE INVENTION

The above and other objects and features of the present invention are realized by a composite filter having alternate patterns of different wavelength interference material. The composite filter, which is constructed by bonding together two complimentarily etched interference filters, generates a structured light pattern from light directed at a single side of the composite filter. The structured light is directed upon an object. An optical receiver generates signals from which it is possible to determine three dimensional surface measurements.

The composite filter comprises: a first interference filter having a first substrate and a first interference pattern on an interference side of the first substrate, the first interface side of the first substrate, the first interface pattern having: (i) first interference material which passes interference reflectable electromagnetic radiation at a first wavelength and reflects interference reflectable electromagnetic radiation at a second wavelength, and (ii) first transmission gaps which pass radiation at both the first wavelength and the second wavelength; and a second interference filter having a second substrate and a second interference pattern on an interference side of the second substrate, the second interference pattern having: (i) second interference material which passes radiation at the second wavelength and reflects radiation at the first wavelength and (ii) second transmission gaps which pass radiation at both the first wavelength and the second wavelength; and wherein the first interference filter and the second interference filter are bonded together with the first interference material at least partly in registration with the second transmission gaps and the second interference material at least partly in registration with said first transmission gaps. The interference side of the first interference filter abuts the interference side of the second interference filter. The first interference material is at least partially in registration within the second transmission gaps and the second interference material is at least partially in registration within the first transmission gaps. The first and second interference material may be arranged in stripes and the first and second transmission gaps may be stripes.

The system further comprises: the composite filter and a radiation director for directing radiation of both the first wavelength and the second wavelength, the radiation director positioned to direct radiation directly onto the composite filter. The system is operable to acquire surface measurement data by scanning the surface of an object, the system further comprising: a receiver for receiving radiation from the radiation director after passage through the composite filter and reflection from the object, the receiver receiving radiation at a predetermined parallax angle and including: (i) wavelength separator for separating the reflected radiation of the first wavelength from the reflected radiation of the second wavelength, (ii) a first sensor for sensing reflected radiation of the first wavelength and generating a first electrical signal based on the sensed radiation, and (iii) a second sensor for sensing reflected radiation of the second wavelength and generating a second electrical signal based on the sensed radiation. The sensors may scan in unison.

The present invention may alternately be described as a system comprising: a first substrate having a planar interference side; first interference material in a pattern on the interference side of the first substrate, the first interference material operable to pass light at a first wavelength and to reflect light at a second wavelength, the first interference material pattern having a number of transmission gaps between adjacent portions of the first interface material; and a light director positioned to direct light of both the first wavelength and the second wavelength directly at a side of the first substrate; and wherein light from the light director passing through the substrate is structured into first wavelength light corresponding to the first interference material and light including second wavelength light corresponding to the gaps. The system further comprises second interference material in a pattern at the interference side of the first substrate, the second interface pattern operable to pass light at the second wavelength and reflect light at the first wavelength, the second interferance material at least partially in registration with the gaps. The first and second interference materials may be arranged in stripes. The system is operable to acquire surface profile measurement by scanning the surface of an object, the system further comprising: a receiver for receiving light from the light director after passage of the light through the first and second interference materials and its reflection from the object, the receiver receiving radiation at a predetermined parallax angle and including a wavelength separator, a first sensor, and a second sensor. The first sensor senses first wavelength light, whereas the second sensor senses second wavelength light. The system further comprises: a second substrate having an interference side, and wherein the second interference material is on the interference side of the second substrate, and the second substrate is bonded to the first substrate with the interference side of the first substrate abutting the interference side of the second substrate.

The present invention also encompasses the method of using the composite filter comprising the steps of: generating interference reflectable electromagnetic radiation of at least first wavelength and a second wavelength; and passing the radiation through a composite filter having: (i) a first substrate having an interference side, (ii) a gapped pattern of first interference material at the interference side of the first subscrate, the first interference material operable to pass radiation at the first wavelength and reflect radiation at the second wavelength, and (iii) a gapped pattern of second interference material at the interference side of the first substrate, the second interference material operable to pass radiation at the second wavelength and to reflect radiation at the first wavelength; and wherein passage of the radiation through the composite filter structures the radiation into beams of first wavelength radiation and second wavelength radiation. The method further comprises the step of directing the beams of radiation onto the surface of an object. The beams of radiation may be in the form of alternate stripes. The interference side of the first substrate is planar and the radiation perpendicularly strikes the interference side of the first subsbrate. Reflected radiation from the object is received in a receiver at a predetermined parallax angle. The reflected radiation of the first wavelength is sensed in a first sensor in the receiver, the first sensor generating a first electrical signal based on the radiation which it senses. A second sensor in the receiver likewise senses second wavelength radiation and generates an electrical signal based thereon. The first electrical signal is independent of reflected radiation of the second wavelength and the second electrical signal is independent of reflected radiation of the first wavelength. The method further comprises the steps of: separating the reflected radiation of the first wavelength from the reflected radiation of the second wavelength in a wavelength separator in the receiver, directing the reflected radiation of the first wavelength at the first sensor, and directing the reflected radiation of the second wavelength at the second sensor. The method further comprises the step of using the first and second electrical signals to generate surface measurement data.

The method of making the composite filter of the present invention comprises the steps of: creating a gapped pattern of first interference material at an interference side of a first substrate, the first interference material operable to pass interference reflectable electromagnetic radiation at a first wavelength and reflect interference reflectable electromagnetic radiation at a second wavelength; and placing a gapped pattern of second interference material at the interference side of the first substrate, the second interference material operable to pass radiation at the second wavelength and reflect radiation at the first wavelength. The first and second interference material have at least some alternate locations at the interference side of the first substrate, meaning that the first interference material extends to a location which lacks second interference material and the second interference material extends to a location which lacks first interference material. The method further comprises the steps of: creating the second interference material pattern on an interference side of a second substrate, and bonding the first substrate to the second substrate with the interference side of the first substrate abutting the interference side of the second substrate. The first and second interference material patterns are created by selective etching. The selective etching uses photolithographic techniques and masks for creating both the first interference material pattern and the second interference material pattern. It will be appreciated that a common mask might be employed.

BRIEF DESCRIPTION OF THE DRAWINGS

The above and other features of the present invention will be more readily understood when the following description is considered in conjunction with the accompanying drawings wherein like characters represent like parts throughout the several views and in which.

DESCRIPTION OF THE PREFERRED EMBODIMENTS

Figure 1:
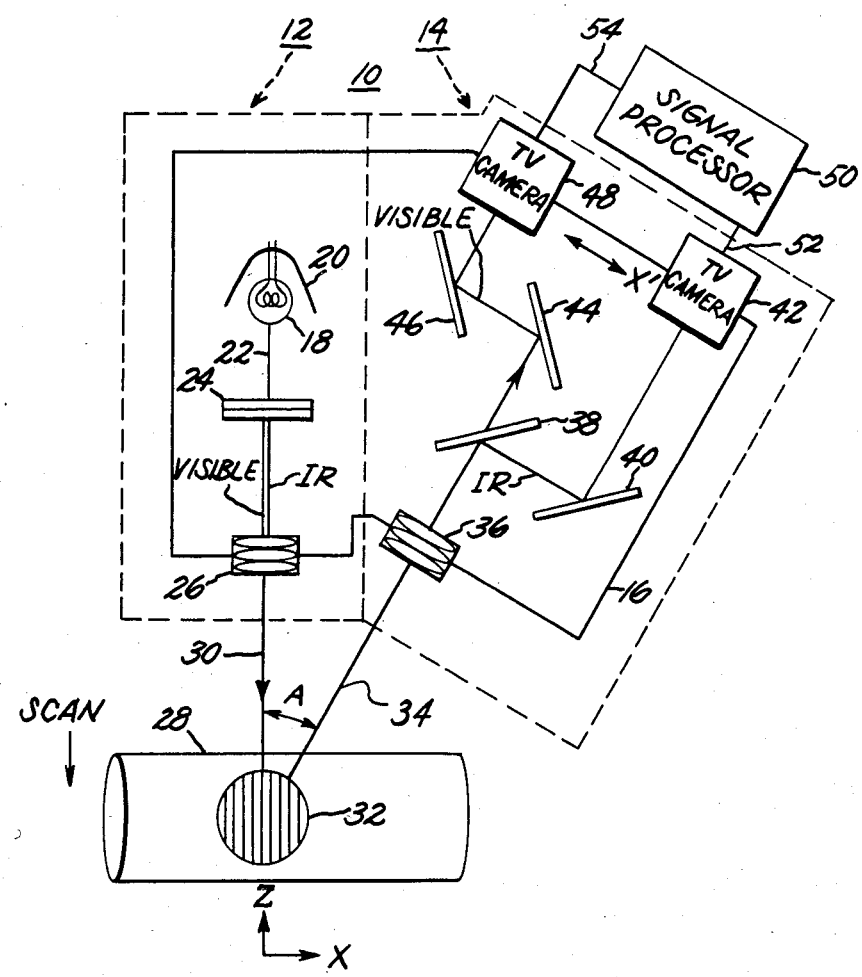
FIG. 1 shows a simplified diagram illustrating the major components of the present invention.

A preferred embodiment of the present invention is shown in the simplified schematic diagram of FIG. 1. The system 10 according to the present invention includes an optical transmitter subsystem 12 and an optical receiver subsystem 14. As schematically illustrated, the optical transmitter 12 and optical receiver 14 may be housed within a common housing 16.

The optical transmitter 12 includes a radiation or light director comprising light source 18 and an elliptical reflector 20. The light source 18 is preferably a xenon arc lamp, which is a multispectral source with illumination in the visible and infrared regions. Specifically, the elliptical reflector is selected to reflect all wavelengths emitted by the source 18. The infrared portion of the illumination (wavelength greater than 8,000 angstroms) represents about 50% of the available power. The radiation or light 22 proceeds directly (i.e., without additional reflection) from the radiation director comprising light source 18 and reflector 20 to a composite filter 24.

The light 22 from the light source 18 and reflector 20 containing an approximately equal power distribution of visible and infrared light strikes the composite filter 24. The composite filter 24 separates the combined visible and infrared light 22 into a plurality (only two are shown in the figure) of visible and infrared beams of light which are directed towards the objective lens 26 for focusing upon a work piece 28 such as airfoil part. As shown, the light 30 proceeding from the objective lens 26 to the work piece 28 results in a pattern of alternate visible stripes or bars of light 32. Although not shown on the work piece 28, alternate stripes of infrared light are disposed between the bars 32 of visible light. Specifically, the power distribution of the light 30 comprises a sinusoidal distribution of visible light and a 180° out of phase distribution of infrared light extending in the X direction, the power distribution being illustrated in FIG. 2.

The light reflected from the airfoil part 28 proceeds to the optical receiver 14 at a parallax angle of A in FIG. 1. Although various angles might be used, it is preferable to use a parallax angle of 3° for the angle A of FIG. 1. Obviously, the angle A is shown larger than 3° in FIG. 1 for ease of illustration. The light 34 reflected from the part 28 will have a power distribution dependent upon the surface of the part 28. The reflected light or radiation 34 is focused by objective lens 36 upon the dichroic filter or "hot" mirror 38. The dichroic or interference filter 38 reflects the infrared light to a parallel reflector 40, which in turn reflects the infrared light to an infrared T.V. camera 42. If desired, an additional filter (not shown) may be used between the reflector 40 and T.V. camera 42 to further decrease the very small amount of visible light which might be reflected by the dichroic filter 38.

The dichroic filter 38 functions as a wavelength separator such that the visible light from lens 36 passes through the filter 38 to a reflector 44. The visible light is reflected by reflector 44 onto reflector 46 which reflects it to a visible light T.V. camera 48. An additional filter (not shown) may be used between the reflector 46 and T.V. camera 48 to further decrease any small amounts of infrared light which may remain after passage through the dichroic or interference filter 38.

As shown in FIG. 1, dichroic filter 38 is parallel to reflector 40 and reflectors 44 and 46 are parallel to each other and perpendicular to dichroic filter 38. Further, the optical distance between the objective lens 36 and the infrared T.V. camera 48 is the same as the optical distance between lens 36 and visible T.V. camera 42. This may be accomplished by making the distance between dichroic filter 38 and reflector 40 equal to the distance between reflector 44 and reflector 46. Additionally, the distance between reflector 40 and T.V. camera 42 is equivalent to the sum of the distance between dichroic filter 38 and reflector 44 and the distance between reflector 46 and T.V. camera 48.

The first and second T.V. cameras 42 and 48 respectively feed first and second electrical signals on respective wires 52 and 54 into a signal processor 50 which may be used to calculate surface measurement data in a similar manner as with the Mundy et al. patent. The particular processing need not be discussed in detail because the present invention, broadly construed, could be realized with an optical receiver as used with the Mundy et al. patent. The avoidance of the depth-of-field problem by use of the present composite filter 24 is advantageous in that it facilitates cross-sinusoid electronic scan by the optical receiver 14 of the present invention.

The T.V. cameras 42 and 48 of the present invention are adapted to scan in the X' axis (the X axis is translated through the parallax angle and various reflectors) in a roughly equivalent fashion to the X axis scan in the Mundy et al patent. Most importantly however, the T.V. cameras 42 and 48 may scan in a Y direction (perpendicular to the plane of FIG. 1 and the X' axis) without the inaccuracies which a two dimensional matrix type sensor would introduce. In particular, the T.V. cameras 42 and 48 are preferably controlled to scan in unison such that the signal processor 50 may calculate a profile by use of each scan line on wire 52 with the corresponding scan line on wire 54 in much the same fashion as the signal processing as used with the Mundy et al patent. The signal processing will be somewhat more sophisticated in that the electronic scan is in two directions in that the T.V. cameras use a plurality of X' scan lines at different Y axis locations instead of one direction. Because of the fully electronic scan in two dimensions, the surface measurements may be calculated without being limited to a single X axis profile for each position of the work piece 28. Thus, the mechanical scan which may turn or move the work piece 28 relative to the system 10 may move the work piece 28 in larger steps than would otherwise be the case. Further, the present system will provide for a fully three dimensional sensor due to the two dimensional electronic scan.

Composite Filter and Method of Making

Figure 3:
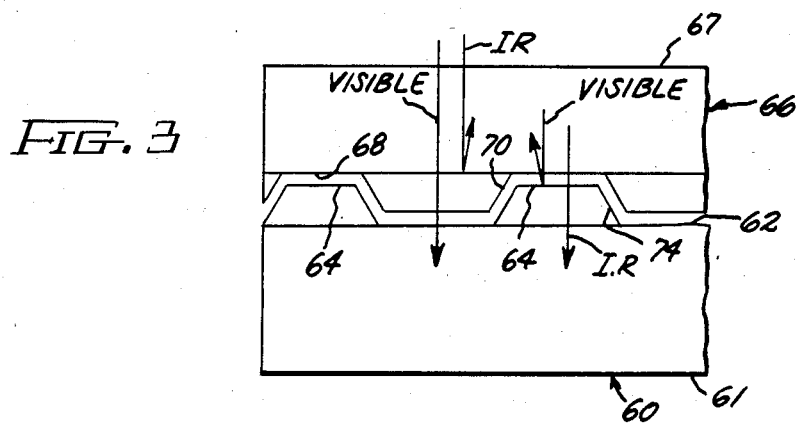
FIG. 3 shows an end view of two selectively etched interference filters just prior to bonding together.
Figure 4:
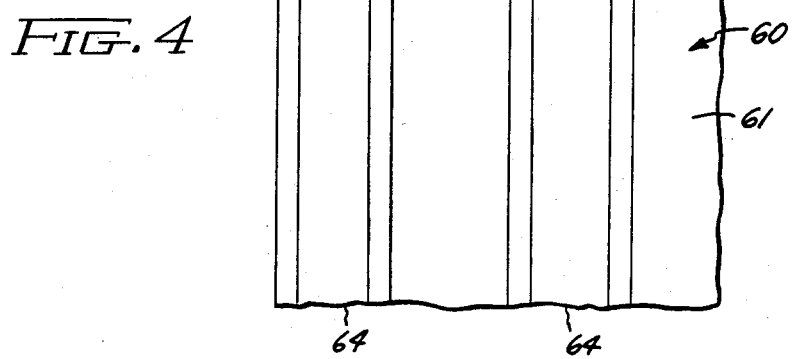
FIG. 4 shows a top view of an interference filter following the selective etching.

The highly advantageous features of the present invention are realized by the composite filter 24 as schematically shown in FIG. 1. Turning now to FIG. 3, the details of the construction of the composite filter 24 will be discussed in detail. In particular, FIG. 3 shows a side of the composite filter 24 with portions broken away. The composite filter 24 according to the present invention comprises a first interference filter 60 having a substrate 61 with an interference side 62 including a first interference pattern, shown here as a series of stripes 64 which extend perpendicular to the plane of the FIG. 3 side view as will best be appreciated by considering the top view of FIG. 4 which simply shows the interference side 62 of substrate 60 and the associated interference pattern stripes 64. The pattern is "gapped" meaning that there are gaps in which the interference material is absent.

As shown in FIG. 3 only, the composite filter 24 further comprises a second interference filter 66 having an interference side 68 on substrate 67 with a second interference material pattern, shown here as having a series of stripes 70. For ease of illustration, the first interference filter 60 and second interference filter 66 are shown slightly separated in FIG. 3. However, upon completion of the assembly of the composite filter 24, the first and second interference filters 60 and 66 would be bonded together in the manner discussed in detail below.

Each of the interference filters 60 and 66 are substantially identically constructed except that the interference stripes 64 and 70 operate on different wavelengths of radiation or, more specifically, light. Additionally, the stripes 64 on the first substrate 61 are shown as fitting within the transmission gaps between the second interference material stripes 70 and the second interference material stripes 70 in turn fit in the transmission gaps defined between the first transmission materials stripes 64 as illustrated in FIG. 3. For the preferred embodiment, the first interference stripes 64 reflect infrared light and transmit visible light and the second transmission material stripes 70 reflect visible light and transmit infrared light. The interference material could be adapted such that the pass bands of the stripes are at any other differing wavelengths of interference reflectable electromagnetic radiation.

In order to make the composite filter 24, it is necessary to modify standard interference filters. In particular, such filters are commercially available from Melles Griot, 1770 Kettering Street, Irvine, California 92714, or other precision optics firms as "hot" and "cold" mirrors. The hot mirrors reflect infrared and transmit visible light, whereas the cold mirrors reflect visible light and transmit infrared light. The specific method used for constructing a composite filter according to the present invention may vary with the particular manufacturer of the hot and cold mirrors used in constructing the composite filter, but the method described below has been found effective with Melles Griot part nos. 03MGH009 (hot mirror) and 03MCS007 (cold mirror).

Figure 5:
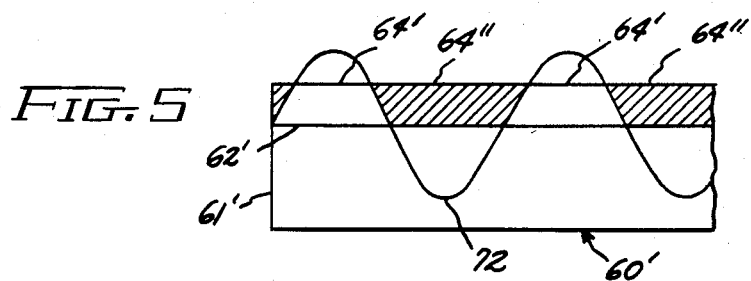
FIG. 5 shows an end view of an interference filter prior to selective etching in accord with the present invention.

Referring now to FIG. 5, there is shown an interference mirror 60' for use in illustrating the construction of the interference mirror 60 of FIG. 3 following the construction method which follows.

The substrate 61' is a prepolished PYREX substrate having identical interference material portions 64' and 64". Portion 64" is shown with cross hatching and will be removed as detailed below. The interference material 64' and 64" is distributed uniformly throughout the interference side 62' of the interference filter 60'. The sine wave 72 is included in FIG. 5 only to illustrate the pattern of removal of the interference material and would not, of course, be a part of the originally procured interference filter 60'. The interference filter material portions 64' and 64" are composed of a large number of extremely thin layers of magnesium fluoride alternating with titanium dioxide and vacuum deposited upon the interference surface 62' of substrate 61'. Depending upon the individual thickness of the layers, the interference filter 60' sets up standing waves which allow passage of light or other interference reflectable electromagnetic radiation at a particular frequency or, more accurately, within a particular band width. Essentially then, the interference filter 60' normally acts as an optical band pass filter and the thicknesses and tolerance of the layers deposited on the substrate determines the Q of the filter. Essentially, the filter 60' has uniform reflection and transmittance characteristics throughout the interference side 62'.

The interference filter 60' having a uniform layer of interference material (64' and 64" together) is coverted into the interference filter 60 of FIG. 3 by use of selective etching methods similar to those used for various microelectronics components.

The process for constructing one of the patterned interference mirrors 60 or 66 from a commercially available mirror such as 60' of FIG. 5 is substantially identical except that one begins with a hot mirror in order to produce the patterned infrared reflecting filter 66, whereas one begins with a cold mirror in order to produce the visible light reflecting filter 60. Accordingly, the process will be described for both mirrors and any minor differences in the method of producing the patterned interference filters will be noted.

Basically, the method for producing the composite filter 24 comprises creating the gapped interference pattern comprising pattern stripes 64 with gaps therebetween (FIG. 3) on the interference side 62 of interference filter 60 followed by the step of placing the second interference material gapped pattern including stripes 70 at the interference side 62 of interference filter 60 as shown in FIG. 3.

The more specific steps which are used to realize the preferred embodiment of the present invention include:

(1) Each interference filter with its uniform interference material layers are cleaned with methyl ethyl ketone, water and detergent, and pure distilled water in order. The interference filters are then blown dry with filtered nitrogen gas.

(2) A layer of photoresist (such as Shipley 1350J diluted 10% with Shipley thinner from Shipley, Inc., 2300 Washington Street, Newton, Mass. 92162) is applied by standard photoresist application techniques to the interference side 62' of the interference filter 60'. Spinning is preferably used to ensure a uniform distribution of the photoresist on the interference material layer comprising portions 64' and 64".

(3) The interference filter 60' with the applied photoresist is baked at 75° centigrade for 15 minutes.

(4) A mask is aligned with the substrate, clamped and exposed via a common photoresist exposure system (20 seconds at approximately 300 watts mercury-vapor). The mask preferably includes uniform stripes alternating with gaps having the same width as the stripes.

(5) The photoresist is developed for 30 seconds in 1:1 mix Shipley AZ developer in water with light agitation.

(6) The interference filter 60' with the photoresist on its interference layer is then rinsed in distilled water and blown dry with filtered nitrogen.

(7) The interference filter 60' is then baked at 75° centigrade for 10 minutes and allowed to cool.

(8) An etchant such as 35 milliliter 5% ammonium bifluoride (NH4F.HF) and 5 milliliter phosphoric acid is prepared.

(9) The etchant is then applied to the interference filter 60'. The time of application will depend on the specific construction of the interference filter, but 90 seconds has been found acceptable for the infrared reflecting interference filter of Melles Griot and 120 seconds has been found effective for the visible light reflecting interference filter of Melles Griot.

(10) The photoresist is removed with methyl ethyl ketone and cotton swabs such as Q-tips. Because the partially destroyed interference coating such as 64" (FIG. 5) may still be adhering to some areas of the substrate 61', cotton swabs may be rubbed moderately strongly on the surface. The unattacked coating is mechanically strong and will not be damaged by wet cotton swabs.

(11) The interference filter 60' now looks like the gapped pattern interference filter 60 FIG. 3 with alternating gaps and interference material stripes 64 and should now be washed in methyl ethyl ketone followed by washing in water and detergent. The interference filter 60 should then be rinsed in distilled water and blown dry with nitrogen.

Figure 2:
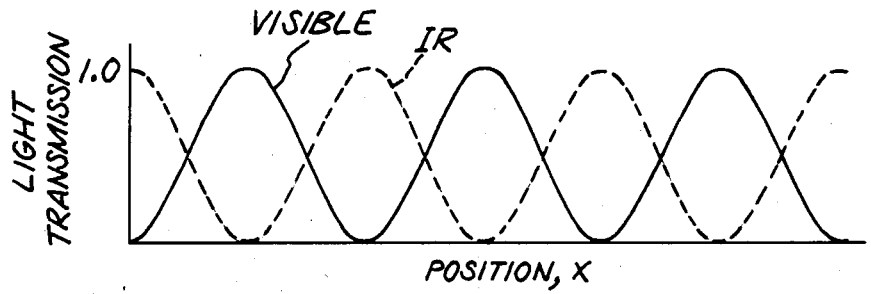
FIG. 2 shows a power distribution curve for the light pattern generated by the present invention.

It will be thus appreciated that the above process of selective etching may produce the two gapped pattern interference filters 60 and 66 of FIG. 3 from standard interference filters having uniform layers throughout. It will be readily appreciated that the sine wave 72 of FIG. 5 is used to differentiate between the interference material 64' which remains after etching and the interference material 64" which is etched away. The mask which is used to accomplish this may simply be alternate stripes. Depending upon the width of the mask stripes and the thickness of the interference material in portions 64' and 64", the edges of the resulting stripes 64 (FIG. 3) may be essentially perpendicular to the surface 62 instead of inclined as shown for edge 74 in FIG. 3. Note that even if the edges such as 74 are essentially perpendicular to the surface 62 for both of the interference filters 60 and 66, passage of radiation through the composite filter 24 will still produce a power distribution as a sinusoid function as shown in FIG. 2 because of the relatively small width of the alternating stripes of interference material 64 or 70 and the passage of light from the composite filter 24 through the objective lens 26 (refer back momentarily to FIG. 1). The objective lens 26 tends to change a square wave power distribution into a sine wave.

The interference patterns as used with the present invention could have significant overlaps of both interference materials to realize a structured radiation distribution of infrared-no light-visible light. Alternately, the adjacent stripes 64 and 70 could be spaced from each other (i.e., between stripe edges such as 74 in FIG. 3) to allow both infrared and visible light to pass through part of the filter 24.

When the composite filter 24 is to be used for three dimensional noncontact sensing as with the FIG. 1 system in the Mundy invention, the use of 160 cycles per inch (160 stripes of interference material with 160 transmission or non-interfering stripe gaps of identical width in between adjacent interference material stripes) is appropriate.

Following the selective removal or etching process outlined above, the two interference filters 60 and 66 (FIG. 3) are stacked on a stereomicroscope stage with the etched interference surfaces 62 and 68 in contact. A spring retainer is used to apply pressure to the stack, and the alignment is checked by viewing the etch patterns with visible light at approximately 75 times magnification. Any adjustments to the pattern alignment and registration may be carried out at this point. The gapped interference patterns used for the system tend to self-align because the first interference material stripes 64 fit or are positioned within the transmission gaps between the second interference material stripes 70 and the second interference stripes 70 fit within the transmission gaps between the first interference stripes 64. Only slight manual intervention is necessary due to this self-aligning feature.

The stack is then lightly tacked along one edge with a temperature resistant two-part epoxy, such as Barcobond, which is available from Barco Chemicals, 327 S. LaSalle, Chicago, Ill. 60604. The epoxy is allowed to harden and final alignment check is carried out by visual inspection. If the alignment is satisfactory, then the edges are fully bonded, the epoxy is allowed to harden and the assembly is ready to use.

Although the composite filter 24 of the present invention is highly advantageous in the context of a three dimensional sensor system as shown in FIG. 1, numerous other applications exist for the composite filter 24. By use of simple linear photodiode arrays as with the Mindy et al. patent, the interference filter 24 could be used for a profile sensor system as used with that patent. For either of these uses, the composite filter is highly advantageous in that the lamp axis (along light beam 22 of FIG. 1) is not offset from the projection axis 30 of FIG. 1. Most importantly, the composite filter 24 allows for a very compact and inexpensive optical projector which is easy to align.

The composite filter 24 of the present invention is further useful for optical tooling techniques. Such optical tooling techniques may use the precise placement of light in order to control the tooling of a part or, alternately, to otherwise apply points of reference to a work piece or member. Further, a selectively etched precision interference filter such as 60 of FIG. 3 may be used to label a point or an article with the Gray code or similar code. Note further that the pattern need not be symmetric. The use of the striped pattern allows convenient use of the Mundy et al. patent signal processor 50. Other patterns would be used for other methods of signal processing.

Although various particular constructions have been disclosed herein, it will be understood by those skilled in the art that various modifications and adaptations may be readily made without departing from the spirit and scope of the present invention.

The invention claimed is:

1. A composite filter comprising:
    (a) a first interference filter having a first substrate and a first interference pattern on an interference side of said first substrate, said first interference pattern having:
        (i) first interference material which passes interference relfectable electromagnetic radiation at a first wavelength and reflects interference reflectable electromagnetic radiation at a second wavelength, and (ii) first transmission gaps which pass radiation at both said first wavelength and said second wavelength; and (b) a second interference filter having a second substrate and a second interference pattern on an interference side of said second substrate, said second interference pattern having:

(i) second interference material which passes radiation at said second wavelength and reflects radiation at said first wavelength; and (ii) second transmission gaps which pass radiation at both said first wavelength and said second wavelength; and wherein said first interference filter and said second interference filter are held in alignment with said first interference material at least partly in registration with said second transmission gaps and said second interference material at least partly in registration with said first transmission gaps; said interference side of said first interference filter abuts said interference side of said second interference filter; and said first interference material is positioned within said second transmission gaps and said second interference material is positioned within said first transmission gaps.

2. The composite filter of claim 1 wherein said first and second interference materials are arranged in stripes and said first and second transmission gaps are stripes.

3. A system comprised of the composite filter as defined in claim 1 and a radiation director for directing radiation at both said first and second wavelength directly onto said composite filter.

4. The system of claim 3 wherein said system is operable to acquire surface measurements by scanning the surface of an object, and further comprises a receiver for receiving radiation from said radiation director after passage through said composite filter and reflection from the object, said receiver receiving radiation at a predetermined parallax angle relative to radiation incident on the object and including (i) a wavelength separator for separating the reflected radiation of said first wavelength from the reflected radiation of said second wavelength, (ii) a first television camera for sensing reflected radiation of said first wavelength and which scans electronically in two dimensions and generates a first electrical signal based on the sensed radiation, and (iii) a second television camera for sensing reflected radiation of said second wavelength and which scans electronically in two dimensions and generates a second electrical signal based on the sensed radiation.

5. The system of claim 4 wherein said television cameras scan in unison.

6. A composite filter comprising:

(a) a first interference filter having a first substrate and a first interference pattern on an interference side of said first substrate, said interference pattern having:

(i) first interference material which passes visible light and reflects infrared light and (ii) first transmission gaps which pass both visible and infrared light; and (b) a second interference filter having a second substrate and a second interference pattern on an interference side of said second substrate, said second interference pattern having:

(i) second interference material which passes infrared light and reflects visible light, and (ii) second transmission gaps which pass both infrared and visible light; and wherein said interference sides of said first and second interference filters are abutting and said first interference material is positioned within said second transmission gaps and said second interference material is positioned within said first transmission gaps.

7. The composite filter of claim 6 wherein said first and second interference materials are said first and second transmission gaps are both arranged in stripes.

* * * * *